United States Patent [19]
Boberg

[11] 3,994,855
[45] Nov. 30, 1976

[54] DEGRADABLE POLYMER COMPOSITION AND PROCESS FOR PREPARING THE SAME
[75] Inventor: Anders Boberg, Jonkoping, Sweden
[73] Assignee: AB Akerlund & Rausing, Lund, Sweden
[22] Filed: Jan. 14, 1975
[21] Appl. No.: 540,778

Related U.S. Application Data
[63] Continuation of Ser. No. 351,909, April 17, 1973, abandoned.

[30] Foreign Application Priority Data
Apr. 18, 1972 Sweden.............................. 4971/72

[52] U.S. Cl..................... 260/42.46; 260/DIG. 43; 526/914
[51] Int. Cl.² .......................................... C08K 3/36
[58] Field of Search ............. 260/45.75 R, 45.75 N, 260/45.75 O, 42.14, 42.44, 42.45, DIG. 33, DIG. 43, 42.46

[56] References Cited
UNITED STATES PATENTS

| | | | |
|---|---|---|---|
| 3,332,926 | 7/1967 | Baron | 260/93.7 |
| 3,382,199 | 5/1968 | Scullin | 260/45.75 R |
| 3,554,959 | 1/1971 | Hammersley | 260/42.44 |
| 3,591,538 | 7/1971 | Smith | 260/23 |
| 3,592,792 | 7/1971 | Newland | 260/41 |
| 3,676,401 | 7/1972 | Henry | 260/63 CQ |
| 3,864,293 | 2/1975 | Miyoshi | 260/45.75 R |
| 3,882,058 | 5/1975 | Brasseur | 260/45.75 P |

Primary Examiner—Paul R. Michl
Attorney, Agent, or Firm—Ladas, Parry, Von Gehr, Goldsmith & Deschamps

[57] ABSTRACT

A polymer composition and a process for preparing the same are provided which composition is degradable under the action of ultraviolet light and/or sunlight and/or thermally and the polymer component of which comprises thermoplastic polymers or copolymers of $\alpha$-olefins, or comprises polystyrene. The composition contains a photolyzable metal compound promoting degradation which is present at least partially in the composition in an extremely finely divided state.

1 Claim, No Drawings

DEGRADABLE POLYMER COMPOSITION AND PROCESS FOR PREPARING THE SAME

This is a continuation, of application Ser. No. 351,909 filed Apr. 17, 1973 now abandoned.

The present invention relates in general to natural degradation of polymers intended for the manufacture of packages. More particularly, the invention relates to a polymer composition which is photochemically and thermally degradable in outdoor environment.

Packages of conventional polymers have been subjected during the last few years to an increasingly critical examination due to much too great tendency, in comparison with cellulose based packages, not to degrade naturally within a reasonable time. During natural degradation there takes place a total dissolution of an organic substance under the action of sun, heat, wind and rain but also due to fungi and microorganisms in the soil. Frequently occurring packaging polymers, such as polyethylene, polypropylene and polystyrene, are without exception highly resistant to natural degradation. According to the present invention, packaging polymers, such as polyethylene, polypropene and polystyrene, may be converted into becoming naturally degradable without the said conversion entailing any negative changes, e.g. a discoloration, inferior indoor stability, toxicity, restricted purposes of use, too high costs, or the like. By naturally degradable polymers according to the invention are understood such polymers as may be dissolved and disappear out of doors within one year after they have been thrown away in nature, on refuse heaps, compost heaps, and the like. It should be pointed out, however, that the invention is generally applicable to any thermoplastic polymer or copolymer even if only the three most important basic polymers in the packaging branch have been mentioned above.

The principal difference between outdoor environments and an indoor environment with respect to the possibilities of degrading polymers is sunlight intensity with respect to both visible and ultraviolet light, as well as the existence of microorganisms. It has been possible to establish that conventional packages of polyethylene, polypropylene or polystyrene, for instance, which lay buried for 5 years in various kinds of soils at different depths were not attacked by the microorganisms of the soil and oxidized. However, a certain oxidation could be demonstrated when packages of the same kind had been kept during the same period of time on the soil surface and in shadow. It is permissible to assume that this is the result of a so-called photooxidation caused by the content of ultraviolet rays in the reflected sunlight.

The following specification will only discuss polyethylene for the sake of simplicity but this does not imply any limitation of the invention to this particular polymer.

The uncatalyzed degradation of polyethylene takes place according to several interdependent reactions. An example of a reaction is photolysis, i.e. disintegration in light, of hydroperoxides. This photolysis requires ultraviolet light:

$$ROOH + h\nu \rightarrow RO. + .OH$$

From the hydroperoxide there are formed an alkoxy radical (RO.) and a hydroxy radical (.OH). The presence of these radicals is highly important for the continued degradation. They may as a matter of fact abstract hydrogen atoms from adjacent polymer chains:

$$RO. + RH \rightarrow ROH + R.$$

$$.OH + RH \rightarrow H_2O + R.$$

There is formed a highly reactive alkyl radical (R.) which immediately adds oxygen and becomes transformed into a peroxy radical (ROO.):

$$R. + O_2 \rightarrow ROO.$$

This may in turn, if with a certain difficulty, abstract adjacent hydrogen atoms and become transformed into a photolyzable hydroperoxide:

$$ROO. + RH \rightarrow ROOH + R.$$

Thereafter the process is repeated as long as the polymer is exposed to ultraviolet light.

As long as synthetically prepared polymers have existed it has been known that compounds of transition metals, for instance, will accelerate the degradation of polymers to a considerable degree both in light and in total darkness. This has been explained in such a way that metal compounds may catalyze the hydroperoxide disintegration:

$$Me^{n+} + ROOH \rightarrow Me^{(n+1)+} + RO. + OH^-$$
$$Me^{(n+1)+} + ROOH \rightarrow Me^{n+} + ROO. + H^+$$

or $$2ROOH \xrightarrow{Me^{n+}/Me^{(n+1)+}} RO. + ROO. + H_2O$$

In literature attention has been paid almost exclusively to these thermal reactions in order to explain the degradation of polymers and no attention has been given to the photochemistry of the metal compounds. However, metal compounds of iron, copper, manganese, cobalt, cerium, vanadium, chromium and nickel, for instance, are photochemically highly reactive when they occur dissolved in organic media or in water which contains organic substances, and when they are exposed to radiation with both ultraviolet and visible light. It is characteristic for all of the metals enumerated above (in the form of metal compounds) that they can absorb energy from light and become activated. Light energy may be absorbed in basically two different ways:

1. Directly:

$$Me-L + h\nu \rightarrow (Me-L)^*$$

2. Intermolecularly:

$$A^* + Me-L \rightarrow (Me-L)^* + A$$

(A is an adjacent molecule or atom which transfers its absorbing light energy to Me—L.)

The energy absorbed by Me—L may then be discharged in four different ways:

3. Intramolecularly: There takes place an energy-consuming transport of electrons within the metal compound

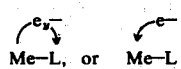

4. Intermolecularly:

$$(Me-L)^* + A \rightarrow A^* + Me-L$$

5. Discharge of heat
6. Luminescence

These six processes take place in light with a transition metal compound in polyethylene which also contains light absorbing carbonyl groups = A.

However, compounds of transition metals may also react in other ways when they occur dissolved in an organic phase containing free radicals and other degradation products of the organic phase. Catalysis of the hydroperoxide disintegration according to what has been stated above is one example. Free radicals in polymers may also take part, for instance in redox reactions with a transition metal compound:

$$Me^{(n+1)+} + RO \cdot \rightarrow Me^{n+} + RO^+$$

$$Me^{n+} + ROO \cdot \rightarrow Me^{(n+1)+} + ROO^-$$

A transition metal compound can also take part in several redox reactions with ketones, aldehydes, alcohols and other degradation products in polymers. Free radicals which are always formed in a polymer subjected to ultraviolet light radiation are very reactive towards metal compounds. The ligand or ligands which are part of the metal compound may often be easily attacked and oxidized by free radicals:

$$Me-L + R \cdot \rightarrow Me-R + L \cdot$$

Ligand L is converted into a new ligand R. In the cases where Me—R is unstable there is disintegration of the molecule.

The reaction which is incomparably most important for the degradation of polymers and which takes place with a transition metal in light is process 3 above, which implies an energy-consuming transport of electrons within the molecule. Most compounds of basically iron, copper, manganese, vanadium and cerium have a marked tendency to such intramolecular energy transport, which results in intramolecular photoreduction or photooxidation of the metal nucleus in the compound. Photoreduction:

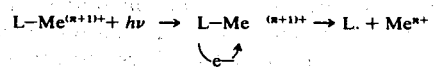

The metal nucleus is reduced and the ligand forms a free radical. This mechanism has been well documented for several decades and is described in detail in literature. Practical and well-known examples of fields of use are blue-printing paper and photopolymerization of several organic substances. In the latter case the formed free radical L. initiates the polymerization in exactly the same way as L. initiates a degradation of polymers in light when polymers contain transition metal compounds.

It appears from the specification and from published scientific literature that it is difficult, if not impossible, to find any compound of a transition metal which is not photolyzed and consequently disintegrates when contained in polymers after a relatively short radiation time in ultraviolet light. All compounds of transition metals (above all iron compounds) are as a matter of fact more or less quickly photolyzable in the highly reactive environment constituted by a photooxydized polymer.

At photolysis in polyethylene, for instance, the metal compound is disintegrated and new ligands are obtained. The appearance of these ligands is determined by the type of polymers which is degraded, due to the fact that the oxidation products of the polymer will form these new ligands. The newly formed metal compound will be in photochemical balance with respect to the polymer and its oxidation products. In polyethylene and polypropylene the greater part of the degradation products consist of water, formic acid, acetic acid and propionic acid. These acids are strong acids in water. They can easily dissolve any metal oxides formed and can form metal formiates, metal acetates and metal propionates. Iron(III)salts of these acids are easily photolyzable in light, the wave lengths of which are less than 4,500 Angstrom, i.e. not only in ultraviolet light but also in a small part of the visible spectrum. A polymer containing iron will therefore, after the originally added iron compound has been photolyzed, be degradable also when the sky is overcast and when there is shadow and, of course, also in total darkness.

It is necessary that a packaging polymer does not become degraded during the time when it is in use. Most transition metal compounds, e.g. carboxylates, are known to oxidize polymers in darkness, i.e. purely thermally. This is a property of the metal compounds which is desirable only when the package has been thrown away on refuse heaps, compost heaps, or in nature. However, according to literature there are a great many examples of transition metal compounds which have little tendency or none at all to oxidize organic substances thermally. This tendency is determined by the ligand or the ligands which form the metal compound together with the metal nucleus.

In order that hydroperoxides may be disintegrated catalytically by a transition metal compound it is required that the hydroperoxide will coordinate directly to the metal nucleus and that the metal nucleus has a suitable redox potential in relation to the hydroperoxide. If the redox potential of the metal compound is such that it is not kinetically advantageous for hydroperoxide disintegration, this process is made difficult. Quite generally it may be said that metal compounds which, due to the properties of the ligand or ligands are stabilized in one of its oxidation stages in relation to one or more other stages, are inactive with respect to thermal oxidation of organic substances.

The potential suitability of a metal compound in a polymer in order to make this naturally degradable is determined by several factors.

1. The size of the active surface of the metal compound in the polymer.
2. The ability of the new metal compound formed after photolysis of becoming photoreduced by ultraviolet and visible light while continously producing free radicals.
3. The ability of the new metal compound formed after photolysis of oxidizing the polymer in total darkness (e.g. in refuse heaps).
4. The ability of the unphotolyzed metal compound not to degrade the polymer indoors, i.e. during its time of use.
5. The toxicity of the unphotolyzed and photolyzed metal compound.
6. Discoloration of the naturally degradable polymer.
7. The prices of the produced naturally degradable polymer as a function of the price and content of the unphotolyzed metal compound.

8. The method of preparing the naturally degradable polymer as a function of the unphotolyzed metal compound.

According to previously published patent specifications relating to naturally degradable polymer compositions it has not been observed that a maximum of active surface per unit of weight of metal compound entails that it is possible to use lower contents of additive. A direct admixture of polymer insoluble cobalt(II)acetate, for instance, entails a low degradation rate because the acetate occurs in the polymer in the state of large or small clods. It is obvious that a fine division of the metal compound in the polymer is a necessary prerequisite, which was previously interpreted by people skilled in the art in such a way that the metal compound must be soluble in the polymer.

The rate at which the transition metal compound may generally be photolyzed in an inert and unreactive environment is of no importance for its general suitability as a degradator for polymers. An overwhelming number of compounds of iron, manganese, copper and several other transition metals are photolyzed out of doors sufficiently quickly in a reactive environment consisting of the above-mentioned thermoplastic polymers according to the mechanisms described above. A polyethylene which contains iron, for instance, becomes brown, whereas a polyethylene containing copper becomes green after being exposed during a relatively short time to radiation of ultraviolet light, irrespective of which iron or copper compound the polyethylene initially contained. What determines the degradability of a polymer out of doors is therefore the type of metal which is part of the polymer and not which metal compound it contained initially and how it is distributed in the polymer.

Naturally degradable polymer compositions in contact with foodstuffs must of course be non-toxic. Thus, metals like cadmium and mercury are unsuitable in this connection. Iron is probably the most suitable metal, at least in the cases where the unphotolyzed iron compound can be solved by the hydrochloric acid in the human stomach. Such free iron (II/III) in the stomach can only be resorbed to 10 percent by the intestine and this quantity, in order to cause toxication, must be considerably in excess of 1 mg per 24 hours, which is the amount corresponding to the normal daily need of an adult.

The invention consequently relates to a polymer composition which is degradable under the action of ultraviolet light and/or sunlight and/or thermally and the polymer component of which comprises thermoplastic polymers or copolymers of $\alpha$-olefins, preferably in the nature of polyethylene, or consists of polystyrene, the composition containing a photolyzable metal compound promoting degradation, and the polymer composition is characterized in that the said metal compound is present at least partially in the composition in an extremely finely divided state, e.g. in a colloidal state, and in that the compound has the general formula Me—X, wherein Me is a metal having an atomic number of 22-29, 40-47 or 57-79, preferably iron, cobalt, copper, manganese or cerium, and wherein X is one or more ligands making the metal compound insoluble in the polymer forming the basis of the composition.

A polymer containing Me—X has been found to be more quickly degradable than the same polymer containing the corresponding molar quantity of metal in the nature of a polymer soluble or polymer insoluble and not finely divided metal compound. The chemical reason for this is as follows.

The effectiveness of a transition metal in a polymer with respect to thermal and photochemical degradation thereof is intimately connected with the property of the metal to change continously between different oxidation stages. In that connection free radicals from the polymer and its oxidation products are often formed. A metal-containing polymer can be characterized as a solid phase where metal compound and polymer molecules lie immovable. The transport of materials in the polymer is performed by low molecular degradation products which have the property of diffusing in the polymer. The rate of degradation is determined by the rate at which the metal nuclei can take part in oxidation and reduction reactions with the polymer and its degradation products, inter alia diffusable reactive degradation products being formed which may start degradation chain reactions outside the reaction zone which occurs in immediate connection with a metal nucleus. In the reaction zone where the metal catalyzed degradation of the polymer takes place three principal components take part:

1. Polymer
2. Diffusable degradation products and
3. Metal compound.

In addition there takes place an extensive non-metal catalyzed degradation of the polymer outside the reaction zone, i.e. between the metal nuclei or the colloidal particles and metal compound. This degradation is brought about by free radicals or photolyzable degradation products being able to diffuse from the reaction zone out into the polymer and oxidizing it.

It is a well known fact that free radicals can be made inactive by reaction with transition metals. These can consequently create free radicals in an organic substance and at the same time inactivate free radicals. The relation between the quantity of free radicals formed which may oxidize the polymer (e.g. ROO. + RH → ROOH + R.) and the quantity which terminates upon reaction with the metal (e.g. $Me^{n+}$ + ROO. → $Me^{(n+1)+}$ + ROO$^-$) is determined by the concentration of metal compound and in what manner this has been distributed in the polymer. At the same molar content of metal compound in a polymer the frequency of termination reactions of diffusable free radicals should be lower when the metal compound occurs e.g. in colloidal form than in soluble form.

In the reaction zones mentioned above the rate at which free radicals are formed increases the more frequently the metal undergoes changes between different oxidation stages. The frequency of these changes is determined by the concentration of oxidizable and reducable components in the reaction zone. The content of such components is in turn dependent on the content of metal in the reaction zone. If the metal compound is soluble in the polymer there is only a single metal nucleus in the zone. On the surface of a colloidal metal compound there is however a very large number of metal nuclei. In the reaction zone around a colloidal metal compound the polymer will create an optimal quantity of free radicals and other reactive degradation products which may diffuse out of the reaction zone and oxidize the polymer without risking being inactivated there by metal nuclei. The result is that a polymer containing e.g. colloidal polymer insoluble particles having an insoluble metal compound on the surface may be degraded more quickly than the same polymer which contains the same molar quantity of a soluble metal compound.

There are a plurality of methods by which Me—X can be incorporated into polymers. Well known chemical and physical basic methods for preparing colloids may for instance be utilized. In the following some methods giving extremely finely divided polymer insoluble metal compound in polymers are enumerated.

Method 1. Mechanical fine grinding of a solid metal compound which is then mixed into a polymer.

Method 2. Fine dispersion of a polymer insoluble substance or admixture of a soluble substance into a polymer. Thereupon a polymer soluble metal compound is added (e.g. a metal stearate) which reacts with the substance in a) ligand exchange reactions or in b) a redox reaction and yields polymer insoluble Me—X.

Method 3. Like the method above although the dispersion or dissolution of the substance takes place in a polymer soluble organic compound which does not consist of the polymer which is to be made degradable. The compound with its content of Me—X is then mixed into a polymer.

Method 4. Admixture of a polymer soluble metal compound into a polymer. The compound is thermally instable at the admixture temperature and is degraded, e.g. to an oxide which is polymer insoluble.

Method 5. Fine dispersion of a polymer insoluble substance in a polymer or in a polymer soluble organic medium with the aid of an inorganic pigment having a very small particle size. Thereupon for instance a metal stearate is added which reacts with the agent, inter alia on the surface of the pigment particles, which may in that connection be coated with adsorbed Me—X.

Method 6. Dispersion of inert, e.g. colloidal, inorganic particles (e.g. alumina) in an organic and polymer soluble melt. Thereupon Me—X is added dissolved in water or in some other volatile liquid. After the liquid has evaporated Me—X occurs in an adsorbed state around the colloidal particles in the organic melt. This is then mixted into a polymer.

The invention implies that considerably lower contents of metal compound in a polymer composition as compared with composition prepared according to previously known methods are required in order to produce a natural degradation within one year. This is only possible if the metal compound is insoluble in the polymer.

The metal compound forming part of the polymer composition may be selected from one of the following groups of compounds. The metals forming part of the compounds are those whose atomic numbers were mentioned above.

1. Oxides, hydroxides, chlorides, bromides, sulfates, or nitrates of the metal mentioned above.
2. Metal salts of tetrabasic carboxylic acids, such as EDTA and related acids.
3. Metal salts of tribasic carboxylic acids, such as tricarballylic acid, citric acid and the like.
4. Metal salts of dibasic carboxylic acids having the general formula $COOH-(CH_2)_n-COOH$, where n is O or an integer of 1–8, or of sugar acids, such as malic acid, tartronic acid, tartaric acid, and of polyhydroxodicarboxylic acids, such as mucic acids.
5. Metal salts of monobasic carboxylic acids, such as gluconic acid, racemic acid, glyoxylic acid, mandelic acid, salicylic acid, glycolic acid, lactic acid, 2-hydroxobutyric acid and other low-molecular 2-hydroxocarboxylic acids.
6. Metal complexes of sugars, such as sorbitol, mannitol, dulcitol, xylitol, as well as of other hydroxyl compounds, e.g. pentaerythrithol and derivatives thereof, as well as substituted phenols.
7. Metal complexes of nitrogen, such as triethanol amine, so-called Shiff bases, i.e. derivatives of disalicylidene-alkyldiamines, and oxamide.

In preparing the metal compounds mentioned above, for example in accordance with the methods 2–5 mentioned above, a polymer soluble unstable metal compound, preferably carboxylates of the metals indicated above, such as stearate, naphtenate or caprylate, is caused to react with the acids, etc. mentioned above to obtain the metal compounds listed under items 1–7 above. The compound reacted with the unstable metal compounds is present in molar excess. As an alternative, Me—X can be obtained in a colloidal form directly, for example in accordance with the methods 1 and 6 mentioned above. The above examples of the metal compound forming part of the polymer composition could be multiplied. Reference is made in the connection to the publication "Photochemistry of Coordination Compounds," V. Balzani and B. Carassiti, 1970, Academic Press. It is often most preferable that Me—X is contained in a polymer or in another organic polymer soluble substance in a high concentration. Then dilution takes place with a conventional polymer in extruders in preparing polymer articles which are to be made degradable. Such concentrates are often referred to as master batches.

It is advisable that the organic medium forming part of the master batch consists of the same polymer or polymers as the polymer into which the master batch is then to be admixed. This is not, however, necessary according to the invention. It is consequently possible according to the invention to cause the insoluble metal compound to form part of a polymer soluble melt, such as petroleum based paraffin waxes or microcrystalline waxes. Animal or vegetable waxes may also be used, as well as other compounds such as glycerinmonostearate and stearic acid.

In the case where the organic medium forming part of the master batch consists of a polymer it is important that the said polymer has the right melting index in relation to the polymer into which the master batch is then to be admixed. A higher melting index for the master batch as compared to the other polymer is preferable when 2 to 5 percent by weight of master batch is to form part of the final naturally degradable polymer. At the higher contents of master batch it is advisable that the master batch and the other polymer has the same melting index.

The content of master batch in the finally produced polymer is preferably between two and twenty percent by weight. The content is dependent on among other things such factors as the desired degradation rate, the nature of metal compound (e.g. Me—X) and the size of the finally divided Me—X particles. The content of Me—X in the master batch must besides be such that there occurs no discoloration or other undesired change in the finally produced polymer. The content of Me—X is also dependent on whether the finally divided particles consists completely of Me—X or if any Me—X only occurs adsorbed on the surface of e.g. a colloidal carrier (e.g. silica). In the latter case the content of Me—X can of course be reduced considerably, due to the fact that it is only the surface of the colloidal particles that is effective at oxidation of polymers. It is consequently connected with great difficulties to define a general usable content of Me—X since this must be calculated from case to case with consideration taken to the factors mentioned above. The following example illustrate the invention.

EXAMPLE 1

An experiment was made with transparent and unstabilized high pressure polyethylene having melting index 2 (Unifos DFD-0118) containing varying contents of master batch according to the invention. The organic medium forming part of the master batch consisted in unstabilized high pressure polyethylene (Unifos Dyob S, melting index 20–23). The metal compound in the master batch consists of the reaction product of iron hydroxo-distearate and malic acid (mole malic acid/mole stearate = 5). The content of iron in the master batch is 0.25% with respect to iron hydroxo-distearate. From the polyethylene containing varying contents of master batch there were produced films having a thickness of 0.15 mm and these were illuminated with a Xenon lamp at a relative air humidity of 50% (so called Xeno-test). The time elapsed until the films became totally brittle was determined and is set out in the following Table.

| % master batch | time until total film brittleness (hours) | % longer degradation time in relation to Example 1 |
|---|---|---|
| 100 | 110 | |
| 20 | 165 | 37.5 |
| 15 | 210 | 75.0 |
| 10 | 235 | 46.8 |
| 5 | 300 | 33.4 |
| 2 | 320 | 23.1 |
| 0 | 450 | |

It appears distinctly from the above Table that the invention gives a considerably shorter degradation time when polymer insoluble iron is used, compared to polymer soluble iron, when the molar contents of metal are equal.

EXAMPLE 3

This example shows, like Example 1, how Me—X can be produced directly in an organic medium from a metal compound soluble in this medium and a substance with which the metal compound can react. The reaction product below is Me—X in solid state. In this example Me—X has been produced in an LD-polyethylene melt while being kneaded in a Brabender plastograph at 170° C. The subsequent radiation of the extruded films took place in front of a mercury lamp.

| Polymer | Copper-palmitate % | Iron-hydroxo-distearate % | Glucose % | Sorbitol Sorbitol % | Time until total film brittleness occured (hours) |
|---|---|---|---|---|---|
| PELD-3/1 | 0.10 | — | 0.10 | — | 21 |
| PELD-3/2 | 0.10 | — | — | — | 36 |
| PELD-3/3 | — | 0.10 | — | 0.10 | 12 |
| PELD-3/4 | — | 0.10 | — | — | 15 |
| PELD-0 | — | — | — | — | 41 |

PELD-3/1 is pink in color before radiation due to the fact that the copper occurs in the nature of copper oxide, a polyethylene insoluble compound formed when the blue copper parmitate has been reduced by glucose. The reaction product at 170° C between iron-hydroxo-distearate and sorbitol is also insoluble in polyethylene. This can be established if slightly higher contents of the respective admixtures than those mentioned above are used. In that case the polyethylene does not become completely transparent, which characterizes polymer melts containing insoluble substances.

| % master batch | time elapsed until total film brittleness hours |
|---|---|
| 100 | 110 |
| 20 | 120 |
| 15 | 120 |
| 10 | 160 |
| 5 | 225 |
| 2 | 260 |
| 0 | 450 |

EXAMPLE 2

An experiment was made with the same polyethylene as in the example above (Unifos DFD-0118). The master batch was based on the same polyethylene as in Example 1. The metal compound in the master batch was in this example polyethylene soluble iron hydroxo-distearate in a content of 0.25%. Films having a thickness of 0.15 mm were produced and these were subjected to a Xeno-test according to Example 1. The following results were obtained:

EXAMPLE 4

Mechanical comminution of solid polymer insoluble metal compounds is one method of obtaining these with a small particle size. This example shows how the particle size of Me—X affects the degradability of polypropylene films in front of a mercury lamp. The metal compound Me—X has been finally ground in one case in a high speed mill for ten minutes. In the other case the corresponding compound is in the nature of the powder formed when the compound has been precipitated, dried and then finely ground manually in a mortar. The admixture of Me—X took place in a polypropylene melt during kneading in a Brabender plastograph at 185° C.

| Polymer | Small particle size | | | Larger particle size | | | Time until total film brittleness occured (hours) |
|---|---|---|---|---|---|---|---|
| | FeEDTA⁻Na⁺ % | Cerium hydroxide % | Manganese citrate % | FeEDTA⁻Na⁺ % | Cerium hydroxide % | Manganese citrate % | |
| PP-4/1 | 0.25 | — | — | — | — | — | 6.0 |
| PP-4/2 | — | — | — | 0.25 | — | — | 9.5 |
| PP-4/3 | — | 0.25 | — | — | — | — | 9.0 |
| PP-4/4 | — | — | — | — | 0.25 | — | 13.5 |
| PP-4/5 | — | — | 0.25 | — | — | — | 9.5 |
| PP-4/6 | — | — | — | — | — | 0.25 | 10.0 |
| PP-0 | — | — | — | — | — | — | 15.0 |

For the respective Me—X the smallest difference as to degradability occurs between PP-4/5 and PP-4/6 in the sample. This can be explained by manganese citrate being precipitated from water solution in a finely crystalline form. these crystals are bonded in the dried powder with weed bonding forces. The shearing forces in the polymer melt result in the crystals being able to separate from each other and being suspended. Approximately the same degree of particle division occurred at the grinding in the high speed mill mentioned above. This is the reason for the relatively low difference in degradability between PP-4/5 and PP-4/6. It is consequently important when Me—X is directly mixed into polymer melts or other organic substances to select Me—X among amorphous or microcrystalline compounds, i.e. compounds which may be easily suspended.

EXAMPLE 5

When Me—X is directly produced in an organic medium by reaction between a soluble metal compound and an insoluble substance the best degradation result is achieved if the substance can be finely dispersed in the organic medium. This medium does not have to consist of the polymer which is to be made degradable but must be soluble in the polymer in question. Copolymers of ethylene and vinyl acetate, so called EVA-polymers, are soluble in for example LD-polyethylene and polystyrene. EVA-polymers contain hydrophilic acetate groups which entail that hydrophilic substances mixed into the polymers can be dispersed due to hydrogen bondings arising between the polymer and the substance. The effect of this is illustrated in the example where 0.5% of sebacic acid was dispersed in an EVA-polymer containing 9% of vinyl acetate in the copolymer. Thereupon 1% of polymer soluble cobalt stearate was admixed. The reaction product, i.e. cobalt sebacate, is insoluble and extremely finely divided in the EVA-polymer. The EVA-polymer was then admixed into LD-polyethylene at a level of 5%. The polyethylene then happened to contain extremely finely divided and polyethylene insoluble cobalt sebacate (PELD-5/1 below. The admixture took place in a Brabender plastograph at a temperature of 165° c. Extruded films were examined with respect to degradability in front of a mercury lamp.

| Polymer | EVA-polymer % | Sebacic acid % | Cobalt stearate % | Time until total film brittleness occurred hours |
|---|---|---|---|---|
| PELD-5/1 | 5.00 | 0.025 | 0.050 | 18 |

-continued

| Polymer | EVA-polymer % | Sebacic acid % | Cobalt stearate % | Time until total film brittleness occurred hours |
|---|---|---|---|---|
| PELD-5/2 | — | 0.025 | 0.050 | 22 |
| PELD-5/3 | — | — | 0.050 | 24 |
| PELD-0 | — | — | — | 41 |

EXAMPLE 6

Many metal compounds are soluble in polymers at the admixture temperatures of interest here but the compounds are temperature sensitive and will undergo a more or less rapid thermal degradation during the course of admixture, during which process for instance a metal oxide or a metal sulphate may be formed which is insoluble in the polymer. This example shows the result of radiation experiments in Xeno-test of clear polystyrene containing extremely finely divided and polystyrene insoluble vanadinium oxide. In the example vanadyl stearate was admixed in a polystyrene melt during kneading in a Brabender plastograph at 190° C. The stearate is completely degraded in two minutes to polymer insoluble oxide. This could be established by the color of the polymer changing to dark grey, i.e. the polymer PS-6/1 assumed the color of the oxide. PS-6/2 was prepared from conventional polystyrene which had been mixed with 10% PS-6/1.

| Polymer | Vanadyl stearate % | Time until total film brittleness occurred hours |
|---|---|---|
| PS-6/1 | 0.40 | 190 |
| PS-6/2 | 0.04 | 135 |
| PS-0 | — | 280 |

According to the example PS-6/2 is more degradable than PS-6/1 in spite of the fact that the latter film contains 10 times higher contents of vanadinium oxide. By means of polymer soluble metal compounds maximum degradability is reached according to literature at contents of metal compounds of about 1%. By means of Me—X the same maximum degradation rate can however by achieved with considerably lower contents. This fact combined with the fact that Me—X due to its insolubility in polymers cannot migrate in these makes the use of Me—X very suitable in degradable packaging polymers which are in contact with food-stuffs.

EXAMPLE 7 when Me—X is directly produced in an organic medium from a soluble metal compound and an insoluble substance the particle size is almost always determined by Me—X and consequently the degradability of the polymers by the dispersability of the substance. This example shows how the comminution of the substance in a polymer can be facilitated with the aid of a silica whose particle units are of colloidal size. Admixture of all additives were made in the example in LD-polyethylene and in a Brabender plastograph at 145° C. The extruded films were subjected to radiation in Xenotests.

| Polymer | Silica % | OX-alic acid % | Mandelic acid % | Manganese stearate % | Iron-hydroxostearate % | Time until total film brittleness occurred hours |
|---|---|---|---|---|---|---|
| PELD-7/1 | 0.01 | 0.05 | — | 0.05 | — | 195 |
| PELD-7/2 | — | 0.05 | — | 0.05 | — | 220 |
| PELD-7/3 | — | — | — | 0.05 | — | 230 |
| PELD-7/4 | 0.01 | — | 0.05 | — | 0.05 | 125 |
| PELD-7/5 | — | — | 0.05 | — | 0.05 | 160 |
| PELD-7/6 | — | — | — | — | 0.05 | 165 |
| PELD-0 | — | — | — | — | — | 450 |

EXAMPLE 8

This example shows how it is possible to obtain a quickly degradable LD-polyethylene with the aid of Me—X which in this case may be dissolved in a volatile solvent, e.g. water or alcohol. the LD-polyethylene film PELD-8/1 contains cerium nitrate adsorbed on silica having an extremely small particle size. The film was produced in the following way. Into a melt of glycerol monostearate and 5% silica a 10% solution of cerium nitrate in water was slowly allowed to drip during stirring so that the content of cerium nitrate adsorbed on the silica particles became 0.5% after the water had evaporated. The melt obtained was allowed to set and was the admixed into LD-polyethylene which was consequently made to contain extremely finely divided cerium nitrate in the polymer. An extruded film was compared with respect to degradability with a film containing the same content of cerium nitrate and which had been finely ground mechanically during 10 minutes in a high speed mill.

| Polymer | Glycerol monostearate % | Silicondioxide % | Cerium nitrate % Colloidal | Cerium nitrate % Finely ground | Time until total film brittleness occurred hours |
|---|---|---|---|---|---|
| PELD-8/1 | 0.473 | 0.025 | 0.0025 | — | 19 |
| PELD-8/2 | — | — | — | 0.0025 | 38 |
| PELD-0 | — | — | — | — | 41 |

What I claim is:

1. A polymer composition having an enhanced susceptibility to degradation by ultraviolet light and/or sunlight and/or heat comprising a polyethylene polymer and a compound formed, in situ, from iron hydroxystearate and mandelic acid, said compound being supported on a silica carrier of colloidal dimensions.

* * * * *